United States Patent
Kim et al.

(10) Patent No.: US 9,887,713 B2
(45) Date of Patent: Feb. 6, 2018

(54) FILTER OF REPEATER FOR MOBILE COMMUNICATION SYSTEM

(71) Applicant: KISAN TELECOM CO., LTD., Seoul (KR)

(72) Inventors: Gyu-Yong Kim, Gunpo-si (KR);
Young-Woan Ahn, Yongin-si (KR);
Kyoung-Jae Lee, Seoul (KR);
Duck-Ho Jin, Yongin-si (KR);
Sung-Hyun Kim, Gunpo-si (KR);
Kyu-Ho Yang, Incheon (KR)

(73) Assignee: KISAN TELECOM CO., LTD., Seoul (KR)

( * ) Notice: Subject to any disclaimer, the term of this patent is extended or adjusted under 35 U.S.C. 154(b) by 9 days.

(21) Appl. No.: 15/300,437

(22) PCT Filed: Mar. 13, 2015

(86) PCT No.: PCT/KR2015/002443
§ 371 (c)(1),
(2) Date: Sep. 29, 2016

(87) PCT Pub. No.: WO2015/156508
PCT Pub. Date: Oct. 15, 2015

(65) Prior Publication Data
US 2017/0117926 A1    Apr. 27, 2017

(30) Foreign Application Priority Data
Apr. 8, 2014  (KR) .................. 10-2014-0041685

(51) Int. Cl.
*H01P 1/38*   (2006.01)
*H04B 1/04*   (2006.01)
(Continued)

(52) U.S. Cl.
CPC ......... *H04B 1/0475* (2013.01); *H01P 1/2002* (2013.01); *H01P 1/207* (2013.01);
(Continued)

(58) Field of Classification Search
CPC ... H01P 1/38; H01P 1/32; H01P 1/383; H04B 1/0475
(Continued)

(56) References Cited

U.S. PATENT DOCUMENTS 5,291,290 A * 3/1994 Vaughan .................. H04N 5/38
333/1.1

FOREIGN PATENT DOCUMENTS

JP      05175736      7/1993
JP      2004312128    11/2004
(Continued)

OTHER PUBLICATIONS

International Search Report—PCT/KR2015/002443 dated Jun. 16, 2015.

*Primary Examiner* — Stephen E Jones
(74) *Attorney, Agent, or Firm* — Cantor Colburn LLP

(57) ABSTRACT

Provided is an intermediate frequency (IF) filter of a repeater for a mobile communication system that enables the use of a normal cyclic prefix (CP) of 4.7 usec as much as possible by minimizing a delay caused by the IF filter of a radio frequency (RF) repeater for the mobile communication system, such as a long-term evolution (LTE) orthogonal frequency-division multiple access (OFDMA) system.

12 Claims, 6 Drawing Sheets

(51) Int. Cl.
  *H04L 25/03*  (2006.01)
  *H01P 1/20*   (2006.01)
  *H01P 1/207*  (2006.01)
  *H01P 1/383*  (2006.01)
  *H04L 27/26*  (2006.01)

(52) U.S. Cl.
  CPC ............... *H01P 1/38* (2013.01); *H01P 1/383* (2013.01); *H04L 25/03834* (2013.01); *H04L 27/2607* (2013.01)

(58) Field of Classification Search
  USPC ................................................ 333/1.1, 24.2
  See application file for complete search history.

(56) References Cited

FOREIGN PATENT DOCUMENTS

JP   2007028050   2/2007
KR    100636383   10/2006

* cited by examiner

FILTER OF REPEATER FOR MOBILE COMMUNICATION SYSTEM

TECHNICAL FIELD

The present invention relates to a filter of a repeater for a mobile communication system, and more particularly, to a filter of a repeater for a mobile communication system that enables the use of a normal cyclic prefix (CP) of 4.7 usec as much as possible by minimizing a delay caused by a filter of a radio frequency (RF) repeater for the mobile communication system, such as a long-term evolution (LTE) orthogonal frequency-division multiple access (OFDMA) system.

BACKGROUND ART

Mobile communication systems are widely developed to provide various types of communication contents, such as voice, data, etc. Such systems may be multiple access systems capable of supporting communication with a plurality of users by sharing available system resources (for example, a bandwidth, transmission power). These multiple access systems include code division multiple access (CDMA) systems, time division multiple access (TDMA) systems, frequency division multiple access (FDMA) systems, 3 GPP long-term evolution (LTE) systems, and orthogonal frequency division multiple access (OFDMA) systems, for example.

In general, radio multiple access communication systems are simultaneously capable of supporting communications with respect to a plurality of radio terminals. Each of the plurality of radio terminals communicates with one or more base stations through transmissions on a forward or backward link. The forward link (also referred to as a down link or downward link) means a communication link from base stations to terminals, and the backward link (also referred to as an up link or upward link) means a communication link from terminals to base stations. Such communication links can be set using a single input single output (SISO) technique, a multiple input single output (MISO) technique, or a multiple input multiple output (MIMO) technique.

Meanwhile, in the above-described, various types of mobile communication systems, a zone of non radio coverage needs to be covered, or a repeater needs to be configured in a region in which installation costs of base stations are burdened. In general, a superheterodyne type radio frequency (RF) repeater is used. Since the superheterodyne type RF repeater uses an intermediate frequency (IF) surface acoustic wave (SAW) filter having a high Q-value so as to remove selectivity, sensitivity characteristics and video frequency, a basic delay (about 1.5 uS to 2.5 uS) of the SAW filter is reflected on equipment.

That is, the superheterodyne type RF repeater easily removes selectivity, sensitivity, and video frequency and uses the IF of 500 MHz or less so as to use a bandwidth of the general SAW filter. A delay basically occurs in the SAW filter, and a delay (a delay time) of about 1.5 to 2.5 us occurs in the SAW filter that uses a bandwidth of 10 MHz.

As described above, since the existing RF repeater satisfies selectivity and sensitivity characteristics and uses the SAW filter so as to effectively remove video frequency, a delay of another element is added to the basic delay that occurs in the SAW filter such that the existing RF repeater has an equipment delay of at least 2 to 3 uS and due to the equipment delay, there is a limitation in using a high-output RF repeater in the range of a normal cyclic prefix (CP) (about 4.7 uS) of OFDMA.

Also, a conventional IF filter of a repeater for a mobile communication system, i.e., the SAW filter has characteristics of a rapid bandwidth at an IF (70 MHz) but has a disadvantage with a very large group delay of 1.5 to 2.5 uS.

TECHNICAL SOLUTION

The present invention provides a filter of a repeater for a mobile communication system that enables the use of a normal cyclic prefix (CP) of 4.7 usec as much as possible by minimizing a delay caused by a filter of a radio frequency (RF) repeater for the mobile communication system, such as a long-term evolution (LTE) orthogonal frequency-division multiple access (OFDMA) system.

According to an aspect of the present invention, a filter of a repeater for a mobile communication system includes: a filter of a repeater for a mobile communication system, the filter including: a band pass filter (BPF) configured to perform filtering so as to obtain signals in an intermediate frequency (IF) bandwidth by inputting signals in an IF bandwidth; an inverter configured to generate and output signals each having an opposite phase of deteriorated ripple characteristics so as to supplement the deteriorated ripple characteristics of signals output from the BPF; and a circulator configured to couple output signals of the BPF to output signals of the inverter, to remove the deteriorated ripple characteristics included in the output signals of the BPF and then to output the signals from which the deteriorated ripple characteristics are removed.

The BPF may include at least one selected from the group consisting of a cavity filter, a dielectric resonator (DR)-cavity filter, and a DR filter, and the DR filter may include a DR filter that operates in at least one selected from the group consisting of a transverse electric (TE) mode, a transverse magnetic (TM) mode, and a non-radiative dielectric waveguide (NRD) mode.

The BPF may output signals in a desired IF bandwidth by inputting signals in an IF bandwidth of 500 MHz or more, and the BPF may have a delay of 400 nS or less.

The circulator that is a three-port circulator having single direction rotation characteristics may input output signals of the BPF to a first port, may input output signals of the inverter to a third port, and may output IF signals from which the deteriorated ripple characteristics are removed, through a second port.

According to another aspect of the present invention, a filter of a repeater for a mobile communication system includes: a band pass filter (BPF) configured to perform filtering so as to obtain signals in an intermediate frequency (IF) bandwidth from input signals; an inverter configured to generate and output signals each having an opposite phase of deteriorated ripple characteristics so as to supplement the deteriorated ripple characteristics of the BPF; and a circulator configured to couple the input signals in an IF bandwidth of 500 MHz or more to output signals of the inverter, and to provide the coupled signals as input signals of the BPF.

BEST MODE OF THE INVENTION

Figure 1:
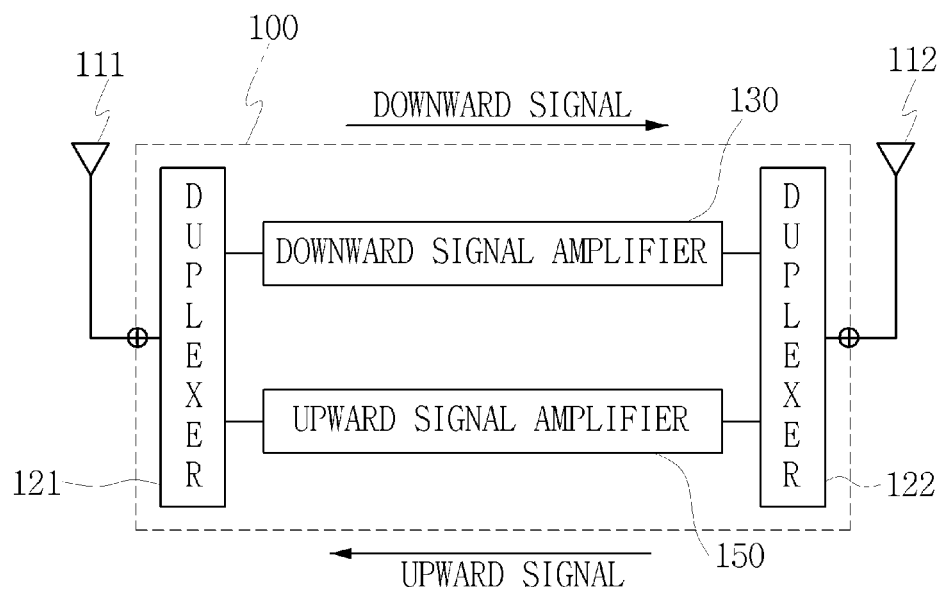
FIG. 1 is a view of a configuration of a repeater for a mobile communication system according to an example embodiment of the present invention.

The present invention will now be described more fully with reference to the accompanying drawings, in which example embodiments of the invention are shown. When adding reference numerals to elements of each of the drawings, like reference numerals are used for like elements although indicated in different drawings. Also, in the description of the present invention, if it is determined that a detailed description of commonly-used configurations or functions related to the invention may unnecessarily obscure the subject matter of the invention, the detailed description will be omitted.

FIG. 1 is a view of a configuration of a repeater for a mobile communication system according to an example embodiment of the present invention. As illustrated in the drawing, the repeater for the mobile communication system may include duplexers 121 and 122, a downward signal amplifier 130, and an upward signal amplifier 150.

The duplexer 121 is connected to a donor antenna 111 that faces a base station (not shown) and is used to separate downward (also referred to as forward) signals received through the donor antenna 111 from transmitted upward (also referred to as backward) signals. For example, the downward signals received from the donor antenna 111 are output to the downward signal amplifier 130, and the upward signals input from the upward signal amplifier 150 are transmitted to the base station through the donor antenna 111.

The duplexer 122 is connected to a service antenna 112 that faces a user terminal (not shown) and is used to separate upward signals received through the service antenna 112 from transmitted downward signals. For example, the upward signals received from the service antenna 112 are output to the upward signal amplifier 150, and the downward signals input from the downward signal amplifier 130 are transmitted to the user terminal through the service antenna 112.

The downward signal amplifier 130 is used to process the downward signals input from the duplexer 121 through amplification and to output the amplified signals to the duplexer 122. For example, the downward signal amplifier 130 may be configured to have a superheterodyne type amplifier structure. In particular, in the superheterodyne type amplifier structure, a frequency down converter (see 131 of FIG. 2) is configured to convert downward signals in an input high frequency bandwidth into downward signals in an IF bandwidth of 500 MHz or more and to output the converted signals, and an IF filter (see 130e of FIG. 2) that performs filtering so as to obtain signals in a desired IF bandwidth from the downward signals in the IF bandwidth output from the frequency down converter, is configured to as a filter having a delay of 1 usec or less.

The upward signal amplifier 150 is used to process the downward signals input from the duplexer 122 through amplification and to output the amplified signals to the duplexer 121. For example, the upward signal amplifier 150 may be configured to have a superheterodyne type amplifier structure. In particular, in the superheterodyne type amplifier structure, a frequency down converter (see 151 of FIG. 3) is configured to convert downward signals in an input high frequency bandwidth into downward signals in an IF bandwidth of 500 MHz or more and to output the converted signals, and an IF filter (see 150e of FIG. 3) that performs filtering so as to obtain signals in a desired IF bandwidth from the downward signals in the IF bandwidth output from the frequency down converter, is configured as a filter having a delay of 1 usec or less.

Since the conventional superheterodyne type amplifier generally uses a surface acoustic wave (SAW) filter so as to easily remove selectivity, sensitivity and video frequency, an upward/downward IF has to be used to be 500 MHz or less so as to use the bandwidth of the SAW filter. However, according to the current embodiment, a filter that uses an upward/downward IF of 500 MHz or more (1 GHz or more recommended), satisfies selectivity and sensitivity characteristics, easily removes video frequency and has a much lower delay than that of the existing SAW filter, i.e., 1 usec or less or 0.5 usec or less, can be used.

Thus, according to the above-described current embodiment, an RF repeater having a much smaller equipment delay than that of the existing RF repeater in an orthogonal frequency-division multiple access (OFDMA) technique, can be manufactured, and a problem relating to a limitation of use of the RF repeater due to a limitation in the range of the normal CP (about 4.7 uS) in the OFDMA technique is s solved so that utilization of a high-output RF repeater is increased and a high-quality service area can be enlarged.

Figure 2:
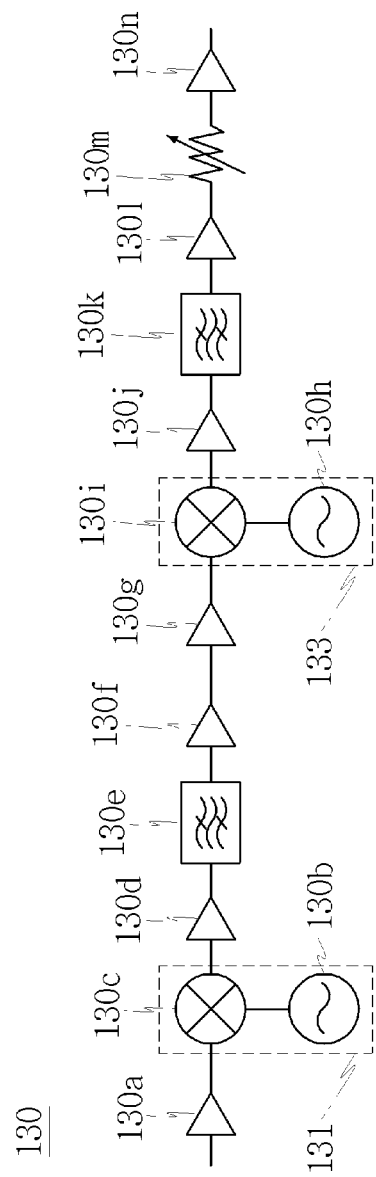
FIG. 2 is a detailed view of a configuration of a downward signal amplifier of FIG. 1.

FIG. 2 illustrates an example of a detailed configuration of the downward signal amplifier 130 of FIG. 1. As illustrated in the drawing, the downward signal amplifier 130 may be configured to have the same or similar structure as or to the structure of a general superheterodyne type amplifier in which a frequency down converter 131 including an amplifier 130a, a local oscillator 130b and a mixer 130c, a frequency up converter 133 including an amplifier 130d, an IF filter 130e, amplifiers 130f and 130g, a local oscillator 130h and a mixer 130i, an amplifier 130j, an RF filter 130k, an amplifier 130l, a variable attenuator 130m and an amplifier 130n are is sequentially connected in series. Thus, detailed descriptions thereof will be omitted.

According to the current embodiment, the frequency down converter 131 may be configured to convert downward signals in an input high-frequency bandwidth into downward signals in an IF frequency of 500 MHz or more and to output the converted signals, and the IF filter 130e may be configured as a filter that performs filtering so as to obtain signals in a desired IF bandwidth from downward signals in an IF bandwidth of 500 MHz or more and has a delay of 1 usec or less.

In the current embodiment, the IF filter 130e that has a delay of about 1 usec or less or about 0.5 usec or less may be configured to include at least one selected from the group consisting of a cavity filter, a dielectric resonator (DR)-cavity filter, and a DR filter.

Figure 3:
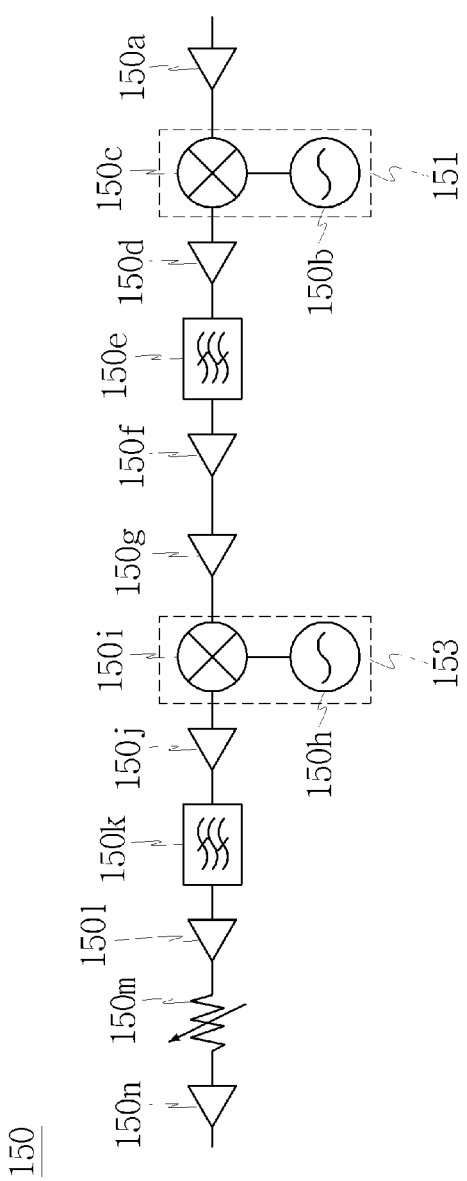
FIG. 3 is a detailed view of a configuration of an upward signal amplifier of FIG. 1.

FIG. 3 illustrates an example of a detailed configuration of the upward signal amplifier 150 of FIG. 1. As illustrated in the drawing, the upward signal amplifier 150 may be configured to have the same or similar structure as or to the structure of a general superheterodyne type amplifier in which a frequency down converter 151 including an amplifier 150a, a local oscillator 150b and a mixer 150c, a frequency up converter 153 including an amplifier 150*d,* an IF filter 150*e,* amplifiers 150*f* and 150*g,* a local oscillator 150*h* and a mixer 150*i,* an amplifier 150*j,* an RF filter 150*k,* an amplifier 150*l,* a variable attenuator 150*m* and an amplifier 150*n* are sequentially connected in series. Thus, detailed descriptions thereof will be omitted.

According to the current embodiment, the frequency down converter 151 may be configured to convert upward signals in an input high-frequency bandwidth into upward signals in an IF frequency of 500 MHz or more and to output the converted signals, and the IF filter 150*e* may be configured as a filter that performs filtering so as to obtain signals in a desired IF bandwidth from downward signals in an IF bandwidth of 500 MHz or more and has a delay of 1 usec or less.

In the current embodiment, the IF filter 150*e* that has a delay of about 1 usec or less or about 0.5 usec or less may be configured to include at least one selected from the group consisting of a cavity filter, a DR-cavity filter, and a DR filter.

Figure 4:
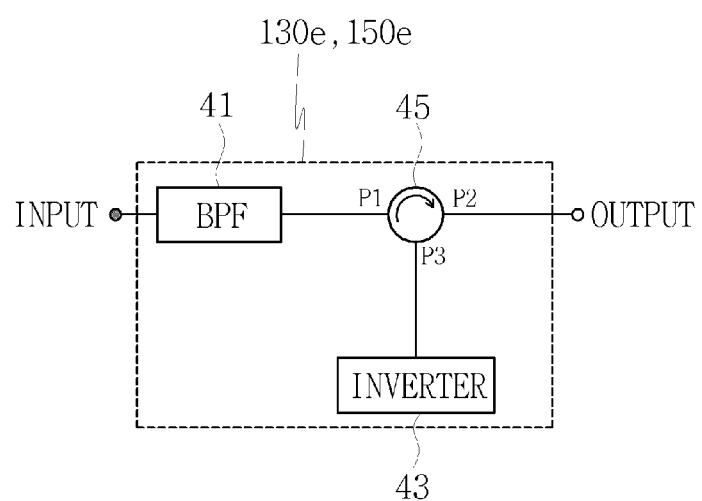
FIG. 4 is a view of a configuration of a filter of a repeater for a mobile communication system according to an embodiment of the present invention.

FIG. 4 is a view of a configuration of a filter of a repeater for a mobile communication system according to an example embodiment of the present invention, for example, a view of an example of a detailed configuration that may be applied to the IF filters 130*e* and 150*e* of FIGS. 2 and 3. As illustrated in the drawing, the filter may include a band pass filter (BPF) 41, an inverter 43, and a circulator 45.

Figure 5:
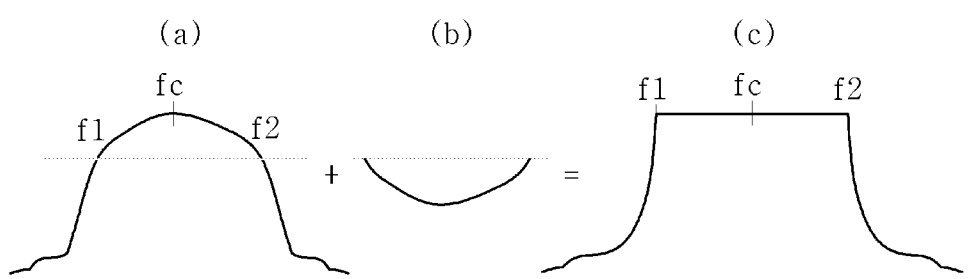
FIG. 5 is a view of an output waveform of FIG. 4.

The BPF 41 inputs signals in an IF bandwidth of 500 MHz or more output from the frequency down converter 131 of FIG. 2 or the frequency down converter 151 of FIG. 3, performs filtering so as to obtain signals in a desired IF bandwidth and outputs signals having a general IF waveform, as illustrated in (a) of FIG. 5. For example, the BPF 41 may be configured as one selected from the group consisting of a cavity filter, a DR-cavity filter, and a DR filter, and the BPF has a delay of about 400 nS or less.

In the current embodiment, the DR filter may include a DR filter that operates in at least one selected from the group consisting of a transverse electric (TE) mode, a transverse magnetic (TM) mode, and a non-radiative dielectric waveguide (NRD) mode.

The inverter 43 generates signals each having an opposite phase to deteriorated ripple characteristics of the BPF 41, as illustrated in (b) of FIG. 5, so as to supplement the deteriorated ripple characteristics of signals output from the BPF 41, i.e., signals having a waveform of (a) of FIG. 5, and outputs the signals. For example, the inverter 43 may generate and output the signals of (b) of FIG. 5 for eliminating the deteriorated ripple characteristics of the BPF 41 using reverse conversion of an input terminal reflection coefficient.

The circulator 45 couples the output signals of the BPF 41 as illustrated in (a) of FIG. 5 to the output signals of the inverter 43 as illustrated in (b) of FIG. 5 to remove the deteriorated ripple characteristics included in the output signals of the BPF 41 and then outputs signals having an IF waveform in which the signals are maintained in a flat state within a desired signal range, as illustrated (c) of FIG. 5. For example, the circulator 45 that is a three-port circulator having single direction rotation characteristics may input the output signals of the BPF 41 as illustrated in (a) of FIG. 5 to a first port P1, may input the output signals of the inverter 43 as illustrated in (b) of FIG. 5 to a third port P3, and may output IF signals from which the deteriorated ripple characteristics are removed, as illustrated in (c) of FIG. 5, through a second port P2.

Figure 6:
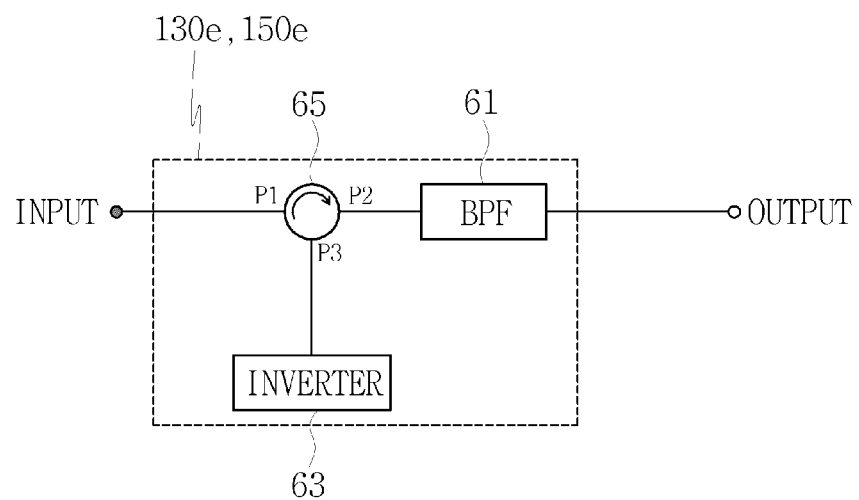
FIG. 6 is a view of a configuration of a filter of a repeater for a mobile communication system according to another example embodiment of the present invention.

FIG. 6 is a view of a configuration of a filter of a repeater for a mobile communication system according to another example embodiment, for example, a view of another example of a detailed configuration that may be applied to the IF filters 130*e* and 150*e* of FIGS. 2 and 3. As illustrated in the drawing, the filter may include a BPF 61, an inverter 63, and a circulator 65.

The BPF 61 inputs signals output from the circulator 65 and performs filtering so as to obtain signals in a desired IF bandwidth from the input signals. For example, the BPF 61 may be configured as one selected from the group consisting of a cavity filter, a DR-cavity filter, and a DR filter, and the DR filter may include a DR filter that operates in at least one selected from the group consisting of a TE mode, a TM mode, and an NRD mode, and the BPF has a delay of about 400 nS or less.

The inverter 63 generates signals each having an opposite phase to deteriorated ripple characteristics of the BPF 61 so as to supplement the deteriorated ripple characteristics of the BPF 61 and outputs the signals. For example, the inverter 63 may generate signals of (b) of FIG. 7 for removing the deteriorated ripple characteristics of the BPF 61 using reverse conversion of an input terminal reflection coefficient.

The circulator 65 couples the output signals of the inverter 63 to signals having an IF bandwidth of 500 MHz or more input from the frequency down converter 131 of FIG. 2 or the frequency down converter 151 of FIG. 3, generates already-distorted signals by opposite phase characteristics of the deteriorated ripple characteristics of the BPF 61 as the result of coupling, and provides the generated signals as input signals of the BPF 61. For example, the circulator 65 that is a three-port circulator having single direction rotation characteristics may input the signals having the IF bandwidth of 500 MHz or more output from the frequency down converter 131 of FIG. 2 or the frequency down converter 151 of FIG. 3 to the first port P1, may input the output signals of the inverter 43 to the third port P3, and may output distorted signals by opposite phase characteristics of the deteriorated ripple characteristics of the BPF 61 through the second port P2, and may provide the output signals as an input of the BPF 61.

Figure 7:
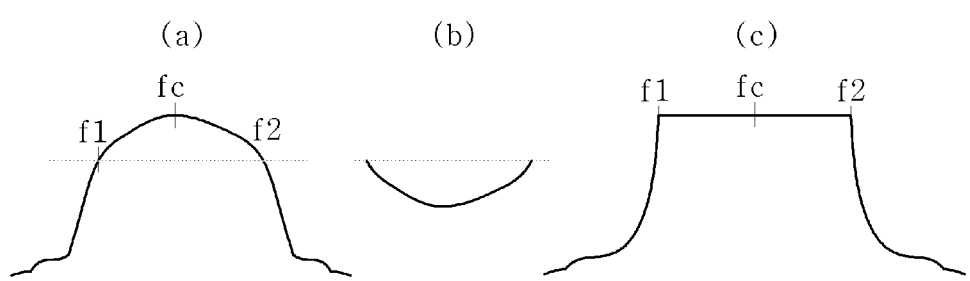
FIG. 7 is a view of an output waveform of FIG. 6.

Thus, the BPF 61 inputs the already-distorted and output signals by the opposite phase characteristics of the deteriorated ripple characteristics of the BPF 61 from the circulator 65 and performs filtering. Thus, since the deteriorated ripple characteristics that occur during filtering, as illustrated in (a) of FIG. 7, are compensated by the already-distorted characteristics due to the output of the inverter 63 as illustrated in (b) of FIG. 7 and are removed so that the IF signals from which the deteriorated ripple characteristics as illustrated in (c) of FIG. 7 are removed, can be output.

The filter of the repeater for the mobile communication system of FIGS. 4 and 6 according to an example embodiment of the present invention is not limited to being used as the IF filters 130*e* and 150*e* of FIGS. 2 and 3, as described above, and may also be applied to the duplexers 121 and 122 of FIG. 1, for example.

Subsequently, an operation of a repeater 100 for mobile communication signals according to an example embodiment of the present invention will be described.

Forward Path

First, a method of relaying downward signals on a forward path in an OFDMA system will be described.

When OFDMA RF signals that are signals in a forward (also referred to as downward) high frequency bandwidth are received from the donor antenna 111, the received forward OFDMA RF signals are provided as an input of the downward signal amplifier 130 through the duplexer 121.

The downward signal amplifier 130 converts the forward OFDMA RF signals input from the duplexer 121 into OFDMA IF signals that are signals in an IF bandwidth using the frequency down converter (see 131 of FIG. 2), in particular, OFDMA IF signals that are signals in an IF bandwidth having a frequency of 500 MHz or more.

Subsequently, the downward signal amplifier 130 performs filtering using the IF filter 130e so as to obtain signals in a desired IF bandwidth from the OFDMA IF signals having the frequency of 500 MHz or more, in particular, in the current embodiment, the IF filter 130e has a delay of 1 usec or less, as described above.

Subsequently, the downward signal amplifier 130 converts the signals in the IF bandwidth filtered by the IF filter 130e into OFDMA RF signals in a high frequency bandwidth using the frequency up converter (see 133 of FIG. 2) and then provides the converted OFDMA RF signals as an input of the duplexer 122 by undergoing procedures, such as amplification, RF filtering, attenuation, power amplification, etc.

Last, the OFDMA RF signals in the high frequency bandwidth output from the downward signal amplifier 130 are separated in a downward path through the duplexer 122 and are transmitted to a user terminal (not shown) through the service is antenna 112.

Backward Path

Next, a method of relaying upward signals on a backward path in the OFDMA system will be described.

When OFDMA RF signals that are signals in a backward (also referred to as upward) high frequency bandwidth are received from the service antenna 112, the received backward OFDMA RF signals are provided as an input of the upward signal amplifier 150 through the duplexer 122.

The upward signal amplifier 150 converts the backward OFDMA RF signals input from the duplexer 122 into OFDMA IF signals that are signals in an IF bandwidth using the frequency down converter (see 151 of FIG. 2), in particular, OFDMA IF signals that are signals in an IF bandwidth having a frequency of 500 MHz or more.

Subsequently, the upward signal amplifier 150 performs filtering using the IF filter 150e so as to obtain signals in a desired IF bandwidth from the OFDMA IF signals having the frequency of 500 MHz or more, in particular, in the current embodiment, the IF filter 150e has a delay of 1 usec or less, as described above.

Subsequently, the upward signal amplifier 150 converts the signals in the IF bandwidth filtered by the IF filter 150e into OFDMA RF signals in a high frequency bandwidth using the frequency up converter (see 153 of FIG. 3) and then provides the converted OFDMA RF signals as an input of the duplexer 121 by undergoing procedures, such as amplification, RF filtering, attenuation, power amplification, etc.

Last, the OFDMA RF signals in the high frequency bandwidth output from the upward signal amplifier 150 are separated in an upward path using the duplexer 121 and are transmitted to a base station (not shown) through the donor antenna 111.

Figure 8:
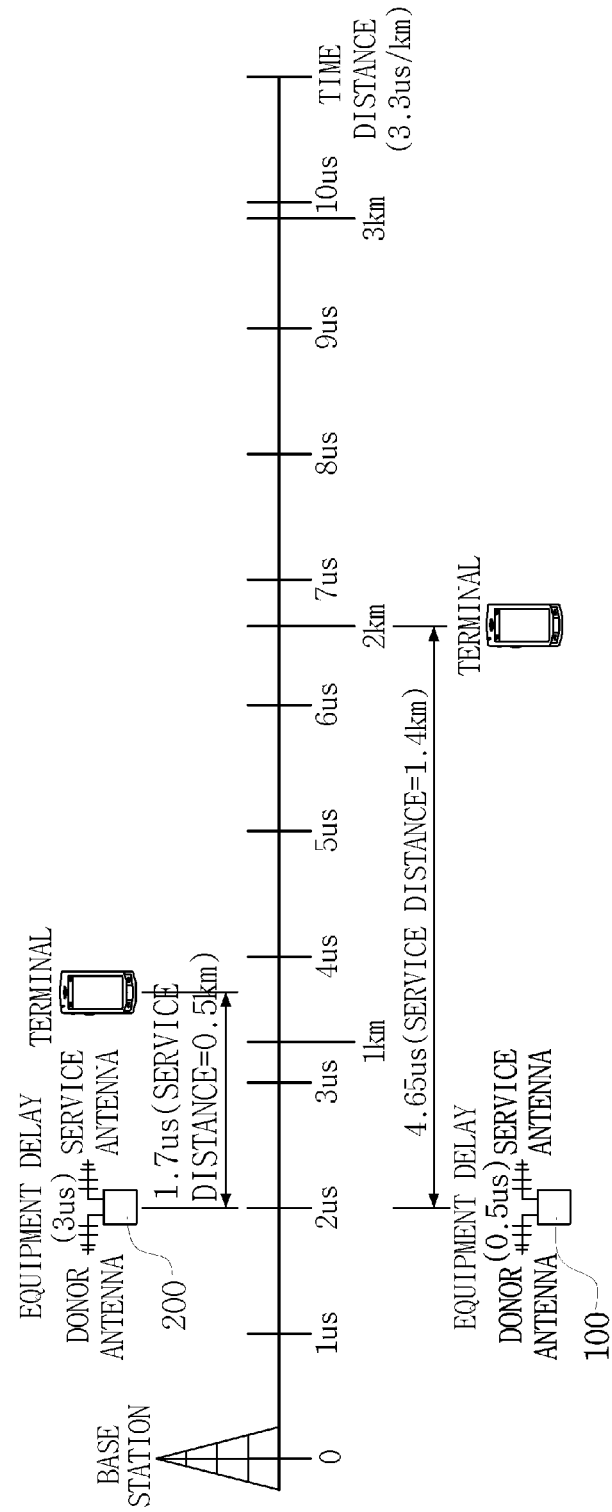
FIG. 8 is a view of an example in which a service distance of the repeater of FIG. 1 is compared with a service distance of the conventional repeater.

FIG. 8 is a view of an example in which a service distance of the repeater 100 of FIG. 1 is compared with a service distance of the conventional repeater 200.

FIG. 5 illustrates an example in which a service distance of the repeater 100 according to the present invention having an equipment delay of about 0.5 us is compared with a service distance of the conventional repeater 200 having an equipment delay of about 3 us, which may be generated at the normal CP of about 4.7 us in the LTE OFDMA technique.

When the RF repeaters 100 and 200 having the equipment delay of about 0.5 us and about 3 us, respectively, are installed at a point of 2 us from the base station, the RF repeater 100 having the equipment delay of 0.5 us may provide more service by about 4.65 us (service distance=1.4 Km) due to the normal CP of about 4.7 us, whereas the RF repeater 200 having the equipment delay of 3 us may provide only a service by about 1.7 us (service distance=0.5 Km) due to the normal CP of about 4.7 us.

Thus, due to the normal CP of about 4.7 us in the LTE OFDMA technique, the service distance of the RF repeater 100 according to the present invention having a much smaller delay than that of the conventional RF repeater 200 is enlarged.

While the present invention has been particularly shown and described with reference to example embodiments thereof, it will be understood by those of ordinary skill in the art that various changes in form and details may be made therein without departing from the spirit and scope of the present invention as defined by the following claims.

INDUSTRIAL APPLIABILITY

As described above, according to various aspects of the present invention, the OFDMA type RF repeater increases a forward/backward IF bandwidth to be 500 MHz or more, a filter for eliminating selectivity, sensitivity characteristics and video frequency can be configured as a cavity filter, a DR-cavity filter, or a DR filter having a much smaller delay than that of the existing SAW filter, and a filter having a very small delay is used so that an equipment delay can be consequentially minimized.

In addition, the equipment delay is minimized so that a problem relating to a limitation of the use of the RF repeater caused by a limitation in the range of a normal CP (about 4.7 uS) in the OFDMA technique is solved and thus the utilization of the high-output RF repeater is increased and a service quality is improved.

In addition, a delay caused by a filter of an RF repeater for a mobile communication system, such as an LTE OFDMA system, is minimized so that a to normal CP of 4.7 usec can be used as much as possible.

In addition, input signals are compensated using an equalization function so as to overcome a long group delay in the existing SAW filter so that optimum signals at a filter output terminal, i.e., high skirt (suppression capability in a rapid bandwidth) characteristics, and ripple characteristics in a desired bandwidth can be satisfied.

The invention claimed is:

1. A filter of a repeater for a mobile communication system, the filter comprising:
   a band pass filter (BPF) configured to perform filtering so as to obtain signals in
   an intermediate frequency (IF) bandwidth by inputting signals in an IF bandwidth;
   an inverter configured to generate and output signals each having an opposite io phase of deteriorated ripple characteristics so as to supplement the deteriorated ripple characteristics of signals output from the BPF; and
   a circulator configured to couple output signals of the BPF to output signals of the inverter, to remove the deteriorated ripple characteristics included in the output signals of the BPF and then to output the signals from which the deteriorated ripple characteristics are removed.

2. The filter of claim 1, wherein the BPF comprises at least one selected from
the group consisting of a cavity filter, a dielectric resonator (DR)-cavity filter, and a DR filter.

3. The filter of claim 2, wherein the DR filter comprises a DR filter that operates in at least one selected from the group consisting of a transverse electric (TE) mode, a transverse magnetic (TM) mode, and a non-radiative dielectric waveguide (NRD) mode.

4. The filter of claim 1, wherein the BPF outputs signals in a desired IF bandwidth by inputting signals in an IF bandwidth of 500 MHz or more.

5. The filter of claim 1, wherein the BPF has a delay of 400 nS or less.

6. The filter of claim 1, wherein the circulator that is a three-port circulator having single direction rotation characteristics inputs output signals of the BPF to a first port, inputs output signals of the inverter to a third port, and outputs IF signals from which the deteriorated ripple characteristics are removed, through a second port.

7. A filter of a repeater for a mobile communication system, the filter comprising:
a band pass filter (BPF) configured to perform filtering so as to obtain signals in
an intermediate frequency (IF) bandwidth from input signals;
an inverter configured to generate and output signals each having an opposite phase of deteriorated ripple characteristics so as to supplement the deteriorated ripple characteristics of the BPF; and
a circulator configured to couple input signals in an IF bandwidth of 500 MHz or more to output signals of the inverter, and to provide the coupled signals as input signals of the BPF.

8. The filter of claim 7, wherein the BPF comprises at least one selected from
the group consisting of a cavity filter, a dielectric resonator (DR)-cavity filter, and a DR filter.

9. The filter of claim 8, wherein the DR filter comprises a DR filter that operates in at least one selected from the group consisting of a transverse electric (TE) mode, a transverse magnetic (TM) mode, and a non-radiative dielectric waveguide (NRD) mode.

10. The filter of claim 7, wherein the BPF outputs signals in a desired IF bandwidth by inputting signals in an IF bandwidth of 500 MHz or more.

11. The filter of claim 7, wherein the BPF has a delay of 400 nS or less.

12. The filter of claim 7, wherein the circulator that is a three-port circulator having single direction rotation characteristics inputs signals in an IF bandwidth of 500 MHz or more to a first port, inputs output signals of the inverter to a third port, and outputs input signals of the BPF through a second port.

* * * * *